Figure 1:
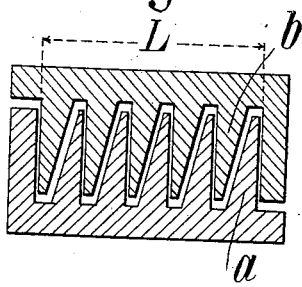
Figure 1A:
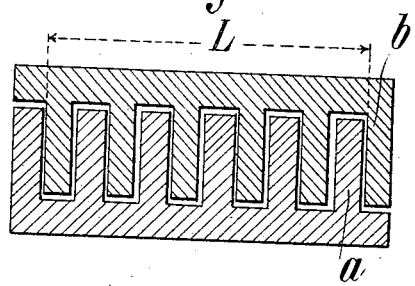

No. 835,836. PATENTED NOV. 13, 1906.
R. SCHULZ.
LABYRINTH PACKING FOR ROTARY MACHINES.
APPLICATION FILED FEB. 27, 1906.

2 SHEETS—SHEET 1.

Witnesses.
H. L. Amer.
B. Sommers

Inventor.
Richard Schulz.
by Henry Orth, atty

UNITED STATES PATENT OFFICE.

RICHARD SCHULZ, OF BERLIN, GERMANY.

LABYRINTH PACKING FOR ROTARY MACHINES.

No. 835,836.  Specification of Letters Patent.  Patented Nov. 13, 1906.

Application filed February 27, 1906. Serial No. 303,205.

*To all whom it may concern:*

Be it known that I, RICHARD SCHULZ, a subject of the King of Prussia, German Emperor, residing at Flensburgerstrasse 2, Berlin, Germany, have invented certain new and useful Improvements in Labyrinth Packing for Rotary Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Labyrinth packing for rotary machines is, as is well known, employed in steam-turbines in various places at which the escape of the steam from a space inside the steam-turbine to an adjacent one inside or outside the same is to be prevented. The essential feature of such labyrinth packing consists in its being formed of annular ribs formed on the shaft or other part of the machine by annular grooves being turned therein, in combination with annular ribs on the part (casing or the like) of the machine which surrounds the shaft or the like, the ribs alternating with and engaging over one another. For instance, a labyrinth packing is employed at the place at which the shaft emerges from the casing of the steam-turbines in impulse steam-turbines, also between the separate tiers of the same along the shaft, in which case the labyrinth packing is of comparatively small diameter. Labyrinth packing of larger diameter is employed in reaction steam-turbines at the so-called "balance-piston." Here, in the one case, the diameter is about equal to the smallest mean diameter of the reaction-turbine, in the other case about equal to the greatest mean diameter of the same.

In order to obtain a suitably-tight joint with annular ribs or ridges, a large number of them must be provided. In order that they may not bend under any circumstances—for instance, in transport or by any contact with one another by reason of inexact adjustment—the annular ribs must have a certain minimum thickness. For this reason the introduction of such a packing requires additional space in the direction of the length of the steam-turbine. It is of importance to reduce this to a minimum in all steam-turbines, and especially those for ships, because the shorter a steam-turbine is and the smaller the distance apart of its shaft-bearings the less strength is required for the separate parts of the same and the more advantageously the turbine-wheels are supported. This invention has for its object to render the arrangement just foreshadowed possible. The improved labyrinth packing for rotary parts of machinery is for this object provided with annular ribs or ridges, formed by turning annular grooves, which ridges in section increase in thickness from the crown to the base—that is to say, are wedge-shaped in section. A labyrinth packing with such annular ribs complies with the requirement as regards strength better than the ordinary ones and affords the most effective surfaces with the smallest requirement of space.

Figure 7:
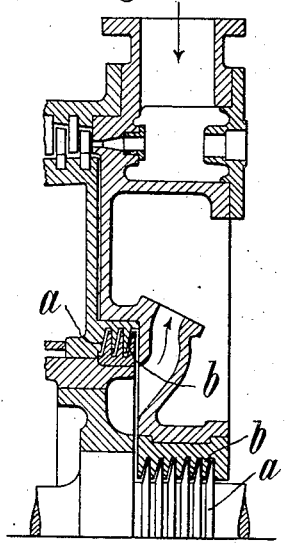
Figure 8:
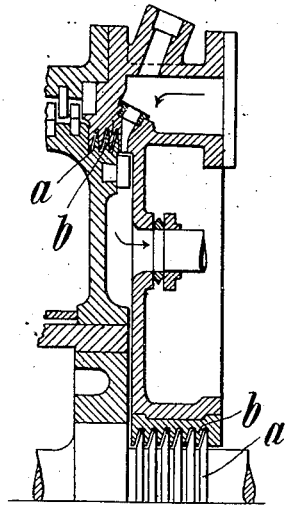
Figure 9:
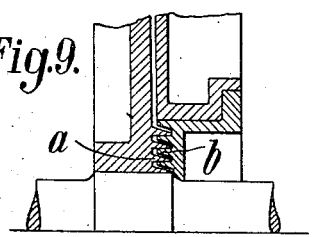

In the accompanying drawings, Figures 1ª and 2ª are known labyrinth packings of this kind in longitudinal section. Figs. 1, 2, 3, 4, 5, and 6 are some examples of construction of the improved labyrinth packing; and Figs. 7, 8, and 9 are sections of the respective parts of steam-turbines, showing ways in which the packing is employed.

All the figures show the labyrinth packing adjusted for the working turbine. In this condition, between the annular ribs $a$ of the rotor (turbine-shaft and turbine-body) and the annular ribs $b$, fixed on or in the casing, there is formed on the one side of the ribs a very narrow and on the other side a comparatively wide passage.

Figure 2:
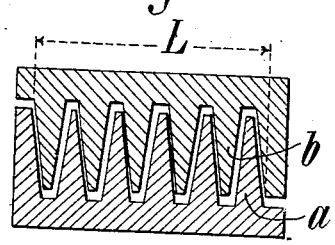
Figure 2A:
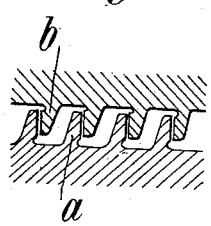

In the labyrinth packing hitherto constructed of the kind in question the annular ribs or ridges have generally a rectangular section, as shown in Fig. 1ª. In the form of construction also employed, such as is shown in Fig. 2ª, the annular ribs on one side are undercut at the base, and farther on the other side of the ribs an excessively-wide interval is provided. With this form of construction a minimum total length of the packing is even less attainable than with the first-mentioned form of construction.

In order to obtain the most effective packing-surfaces of the annular ribs with the greatest saving of space, a wedge-shaped cross-section is given to the annular ribs in such a way that the thickness of the rib gradually increases from the crown to the base of the ribs.

Figure 3:
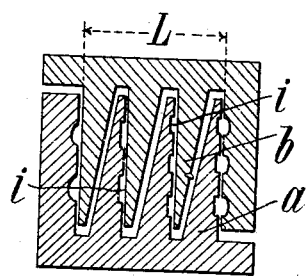
Figure 4:
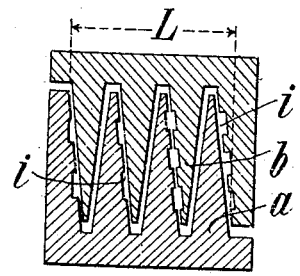

The wedge-shaped annular grooves cut in the respective parts (shaft and turbine body and casing) in order to form the annular ribs $a$ $b$ are of a width which is only slightly greater than the thickness of the ribs. Thereby the size of the wider interval between the ribs $a$ and $b$ is reduced as much as possible, and correspondingly, also, the total length of the packing. In order to further assist the action, suitably-profiled grooves $i$, as shown in Figs. 3 and 4, may be turned in the faces of the annular ribs, which form with one another the narrow interval. These grooves $i$ form hollow spaces or pockets in which solid or fluid particles may be deposited and precipitated and have the further advantage that in case the annular ribs encounter one another, owing to inexact adjustment, they do not suffer so much and are not so much worn.

Figure 5:
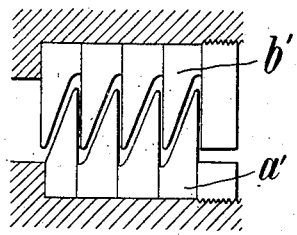

A comparison with the known labyrinth packing or joint, such as shown in Fig. 1ª, yields the following: With six annular ribs which engage over six other ribs—that is to say, with six narrow intervals, as in the form of construction shown in Figs. 1 and 2, this improved labyrinth packing has with an equal height of the ribs a total length which only amounts to two-thirds of the total length of the ordinary form of construction, such as shown in Fig. 1ª. In the form of construction shown in Figs. 3 and 4 the total length of the packing with four annular ribs which engage over four others—that is to say, with four narrow intervals and with one and one-half times greater height of ribs—is not half the total length of the ordinary form of construction shown in Fig. 1. With a still more pointed wedge the wedge-shaped annular ribs may have even a greater height than the ordinary annular ribs of rectangular section, as the former are much more resistant to bending, even when highly heated. The annular ribs do not necessarily require to be made in one piece, as shown in Figs. 1–4, with the rotary part (shaft or the like) of the machine and the fixed part, (casing.) The labyrinth packing might, for instance, as shown in Fig. 5, be made of separate rings $a'$ $b'$, lying closely side by side and held firmly together.

Figure 6:

As further shown in Fig. 6, separate rings or ring-segments $a'$ $b'$ may also be firmly inserted in annular grooves of the respective parts, and then they fulfil the same object. The rings or ring-segments may be held fast in the ordinary way by hammering them lightly down in the annular grooves of the main body of the rotary and fixed parts.

Fig. 7 shows an example of the use of the labyrinth packing hereinbefore described for an impulse steam-turbine with axial flow. Both the rotary turbine-body and also the turbine-shaft engage, by means of annular ribs $a$, which are wedge-shaped in section, with corresponding annular ribs $b$ in the casing. In a radial-flow turbine, combined with an axial-flow turbine, as shown in Fig. 8, annular ribs $a$, which are wedge-shaped in section, engage over suitably-profiled annular ribs $b$, which are mounted in the turbine-casing. The same applies to the example of construction shown in Fig. 9, in which the annular ribs $a$ and $b$ engage over one another in an axial direction instead of in a radial direction, as in the other examples.

From the examples hereinbefore mentioned the great value of the labyrinth packing hereinbefore described may be gathered more particularly by reason of the circumstance that they occupy the minimum of space.

I declare that what I claim is—

1. A labyrinth packing comprising spaced annular ribs on the rotating element and similar spaced ribs on the stationary element fitting between the ribs on the rotating element, said ribs wedge-shaped in cross-section from their root to their crown and positioned to provide a wider interval on one side of a rib than on the other, said wider interval less than the thickness of a rib, substantially as and for the purpose set forth.

2. A labyrinth packing comprising spaced annular ribs on the rotating element and similar spaced ribs on the stationary element fitting in the spaces between the ribs on the rotating element, said ribs having one face perpendicular to the element on which they are mounted and the other face inclined from the root to the crown and positioned relatively to one another to form a wider passage between the inclined faces than between the perpendicular faces, substantially as and for the purpose set forth.

3. A labyrinth packing comprising spaced annular ribs on the rotating element and similar spaced ribs on the stationary element fitting between the ribs on the rotating element, said ribs wedge-shaped in section from their root to their crown, and concentric grooves cut in the faces of the ribs on one of the elements, substantially as and for the purposes set forth.

4. A labyrinth packing comprising spaced annular ribs on the rotating element and similar spaced ribs on the stationary element fitting between the ribs on the rotating element, said ribs wedge-shaped in section from their root to their crown and positioned relatively to one another to form a wider space on one side of a rib than on the other, and concentric grooves cut in the faces of the ribs adjacent the narrower space, substantially as and for the purposes set forth.

5. A labyrinth packing comprising spaced annular ribs on the rotating element and similar spaced ribs on the stationary element fitting between the ribs on the rotating element, said ribs wedge-shaped from their root to their crown and positioned relatively to one another to form a wider space on one side of a rib than on the other, the faces of the ribs adjacent the narrow space having concentric registering grooves cut therein, substantially as and for the purposes set forth.

In testimony that I claim the foregoing as my invention I have signed my name in presence of two subscribing witnesses.

RICHARD SCHULZ.

Witnesses:
 JOHANNES HIN,
 WOLDEMAR HAUPT.